United States Patent
Yoon et al.

(10) Patent No.: US 9,978,534 B2
(45) Date of Patent: May 22, 2018

(54) ELECTRODE STRUCTURE HAVING ROLLED GRAPHENE FILM

(71) Applicants: Samsung Electronics Co., Ltd., Suwon-si, Gyeonggi-do (KR); Samsung Corning Precision Materials Co., Ltd., Asan-si, Chungcheongnam-do (KR)

(72) Inventors: Yeo-heung Yoon, Seoul (KR); Hyo-young Lee, Seoul (KR); Soon-geun Kwon, Chungcheongnam-do (KR); Jae-young Choi, Suwon-si (KR)

(73) Assignees: SAMSUNG ELECTRONICS CO., LTD., Gyeonggi-Do (KR); CORNING PRECISION MATERIALS CO., LTD., Chungcheongnam-Do (KR)

( * ) Notice: Subject to any disclaimer, the term of this patent is extended or adjusted under 35 U.S.C. 154(b) by 248 days.

(21) Appl. No.: 14/173,969

(22) Filed: Feb. 6, 2014

(65) Prior Publication Data

US 2014/0234680 A1      Aug. 21, 2014

(30) Foreign Application Priority Data

Feb. 18, 2013   (KR) ........................ 10-2013-0017157

(51) Int. Cl.
*H01G 11/36* (2013.01)
*H01G 11/24* (2013.01)
(Continued)

(52) U.S. Cl.
CPC ............. *H01G 11/24* (2013.01); *H01G 11/36* (2013.01); *H01G 13/02* (2013.01); *H01M 4/04* (2013.01); *H01M 4/0471* (2013.01); *H01M 4/13* (2013.01); *H01M 4/663* (2013.01); *H01M 4/78* (2013.01); *H01M 10/0587* (2013.01); *B82Y 99/00* (2013.01); *H01G 11/28* (2013.01); *H01G 11/50* (2013.01); *H01M 4/133* (2013.01); *H01M 4/1393* (2013.01); *H01M 4/587* (2013.01);
(Continued)

(58) Field of Classification Search
None
See application file for complete search history.

(56) References Cited

U.S. PATENT DOCUMENTS

2008/0254362 A1    10/2008  Raffaelle et al.
2009/0117467 A1*   5/2009   Zhamu ................. H01M 4/133
                                                          429/231.8

(Continued)

FOREIGN PATENT DOCUMENTS

CN    101849302 A    9/2010
CN    102751512 A    10/2012
(Continued)

OTHER PUBLICATIONS

Dichiara et al. "Chemical Vapor Deposition Synthesis of Carbon Nanotube-Graphene Nanosheet Hybrids and Their Application in polymer Composites" Journal of Nanoscience and Nanotechnology Vil. 12, 6935-40, 2012 (Year: 2012).*

(Continued)

*Primary Examiner* — Lucas J. O'Donnell
(74) *Attorney, Agent, or Firm* — Cantor Colburn LLP (57) ABSTRACT

An electrode structure includes a rolled graphene film which is wound about a central axis, and a nanomaterial dispersed on a surface of the rolled graphene film.

15 Claims, 8 Drawing Sheets

(51) Int. Cl.
*H01G 13/02* (2006.01)
*H01M 4/04* (2006.01)
*H01M 10/0587* (2010.01)
*H01M 4/13* (2010.01)
*H01M 4/66* (2006.01)
*H01M 4/78* (2006.01)
*H01G 11/28* (2013.01)
*H01G 11/50* (2013.01)
*H01M 4/133* (2010.01)
*H01M 4/1393* (2010.01)
*H01M 4/587* (2010.01)
*B82Y 99/00* (2011.01)

(52) U.S. Cl.
CPC .............. *H01M 4/667* (2013.01); *Y02E 60/13* (2013.01); *Y10S 977/932* (2013.01); *Y10T 29/417* (2015.01); *Y10T 29/49115* (2015.01)

(56) References Cited

U.S. PATENT DOCUMENTS

| | | | |
|---|---|---|---|
| 2009/0124705 A1 | 5/2009 | Meyer et al. | |
| 2009/0246625 A1* | 10/2009 | Lu | H01M 4/133 429/207 |
| 2010/0273060 A1* | 10/2010 | Yang | B82Y 10/00 429/231.8 |
| 2011/0157772 A1 | 6/2011 | Zhamu et al. | |
| 2011/0165321 A1 | 7/2011 | Zhamu et al. | |
| 2012/0214068 A1 | 8/2012 | Dai et al. | |
| 2012/0251886 A1 | 10/2012 | Yushin et al. | |
| 2013/0180581 A1* | 7/2013 | Choi | B32B 9/04 136/256 |
| 2013/0264193 A1* | 10/2013 | Lin | C01B 31/0438 204/192.34 |
| 2014/0050920 A1* | 2/2014 | Ray | D02G 3/16 428/368 |

FOREIGN PATENT DOCUMENTS

| | | |
|---|---|---|
| KR | 1020100088667 A | 8/2010 |
| KR | 1020110040055 A | 4/2011 |
| KR | 1020110053012 B1 | 5/2011 |
| WO | 2012148880 A2 | 11/2012 |
| WO | 2012148880 A3 | 11/2012 |

OTHER PUBLICATIONS

European Examination Report for Application No. 14 154 730.7-1808 dated Jun. 12, 2015.
Wang, et al., Rolling up graphene oxide sheets into micro/nanoscrolls by nanoparticle aggregation, Journal of Materials Chemistry, vol. 22, No. 34, Jan. 1, 2012, pp. 17441-17444.
Xie, et al., Controlled Fabrication of High-Quality Carbon Nanoscrolls from Monolayer Graphene, vol. 9, No. 7, Jun. 5, 2009, pp. 2565-2570.
Zeng, et al., Supercapacitors based on high-quality graphene scrolls, Nanoscale, vol. 4, No. 13, Jan. 1, 2012, pp. 3997-4001.
The Extended European Search Report for European Patent Application No. 14154730.7 dated Jun. 24, 2014.
Chinese Office Action for Application No. 2013105382012 dated Jun. 26, 2017.
Chinese Office Action for Application No. 201310538201.2, dated Feb. 2, 2018.

* cited by examiner

ELECTRODE STRUCTURE HAVING ROLLED GRAPHENE FILM

CROSS-REFERENCE TO RELATED APPLICATIONS

This application claims priority to Korean Patent Application No. 10-2013-0017157, filed on Feb. 18, 2013, and all the benefits accruing therefrom under 35 U.S.C. § 119, the disclosure of which is incorporated herein in its entirety by reference.

BACKGROUND

1. Field

Provided is an electrode structure having a roll shape, electrodes and electric devices including the same, and methods of manufacturing the electrode structure.

2. Description of the Related Art

Secondary batteries and electrochemical capacitors ("EC"s) among electric devices are representative of energy storage devices using an electrochemical principle. The ECs use a charge phenomenon by simple migration of ions across an interface between an electrode and an electrolyte, or by a surface chemical reaction. When an electrolyte solution exists between metallic electrodes, electrolyte ions are adsorbed on the surface of an electrode during the application of voltage to electrically charge the EC. Therefore, the EC has been researched as an advanced energy storage device which may be used as an auxiliary battery or a device for replacing a battery due to the possibility of rapid charging and discharging, characteristics of high charge and discharge efficiency and semi-permanent cycle lifetime.

A supercapacitor is one type of EC, and is classified as an electric double layer capacitor ("EDLC"), in which electric charging and discharging occur by physical adsorption and desorption occurring on the surface of an electrode, and as a pseudo capacitor using a rapid and reversible oxidation-reduction reaction of metal oxide.

SUMMARY

Provided is an electrode structure facilitating the diffusion of electrolyte ions as well as having a high electrode density.

Provided is an electrode including the electrode structure.

Provided is an electric device including the electrode and/or the electrode structure.

Provided is a method of manufacturing the electrode structure, the electrode and/or the electric device.

Additional aspects will be set forth in part in the description which follows and, in part, will be apparent from the description, or may be learned by practice of the presented embodiments.

According to an embodiment, an electrode structure includes a rolled graphene film which is wound about a central axis, and a nanomaterial dispersed on a surface of the rolled graphene film.

The graphene film may include a single graphene sheet or a laminate of a plurality of graphene sheets. The graphene sheet may be a single atomic layer graphene sheet, a network sheet having graphene flakes connected to one another, or a combination thereof.

An average thickness of the graphene film may be about 1,000 micrometers (μm) or less.

The graphene film may be porous.

The nanomaterial may have a shape of a discrete particle, a tube, a wire, a rod, a fiber, or a non-discrete bulk unit, or a combined shape thereof.

The nanomaterial may include carbon nanotubes, fullerene, carbon nanowires, carbon nanofibers, activated carbon, carbon black, metal, a metal compound, an organic compound, a polymer, a carbide thereof, or a combination thereof.

An average diameter of the nanomaterial may be in a range of about 1 nanometer (nm) to about 200 nanometers (nm).

The nanomaterial may be dispersed on the surface of the graphene film without agglomeration.

A content of the nanomaterial may be in a range of about 1 wt % to about 50 wt % based on a total weight of the nanomaterial and the graphene film.

A top or bottom surface of the electrode structure has a shape of a circular form, an elliptical form or a polygonal form.

A thickness of the electrode structure may be in a range of about 10 μm to about 1,000 μm, taken along the central axis.

A density of the electrode structure may be in a range of about 0.1 gram per cubic centimeter (g/cc) to about 1.5 grams per cubic centimeter (g/cc).

According to another embodiment, an electrode includes: a current collector; and the foregoing electrode structure disposed on the current collector.

A top or bottom surface of the electrode structure may be inclined with respect to the central axis thereof, and contacts the current collector, and flow paths are defined between facing graphene film surfaces of the rolled graphene film, elongated along the central axis and substantially perpendicular to the current collector.

According to another embodiment, an electric device includes the foregoing electrode. The electric device may be an energy storage device, such as a supercapacitor, a secondary battery, a fuel cell or a solar cell.

According to another embodiment, a method of manufacturing an electrode structure includes: providing a graphene oxide film comprising a nanomaterial dispersed on a surface thereof; winding the graphene oxide film about a central axis; separating a portion of the wound graphene oxide film from a remainder of the wound graphene oxide film; and reducing the separated portion of the wound graphene oxide film.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION

Hereinafter, the present invention will be described in detail. The present invention is described more fully hereinafter with reference to the accompanying drawings, in which embodiments of the present invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on" or "connected to" another element or layer, the element or layer can be directly on or connected to another element or layer or intervening elements or layers. In contrast, when an element is referred to as being "directly on" or "directly connected to" another element or layer, there are no intervening elements or layers present. As used herein, connected may refer to elements being physically and/or electrically connected to each other. Like numbers refer to like elements throughout. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the invention.

The terminology used herein is for the purpose of describing particular embodiments only and is not intended to be limiting of the invention. Expressions such as "at least one of," when preceding a list of elements, modify the entire list of elements and do not modify the individual elements of the list. As used herein, the singular forms "a," "an" and "the" are intended to include the plural forms as well, unless the context clearly indicates otherwise. It will be further understood that the terms "comprises," "comprising," "includes" and/or "including," when used in this specification, specify the presence of stated features, integers, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, the invention will be described in detail with reference to the accompanying drawings.

A supercapacitor is one type of electrochemical capacitor ("EC"). A core material controlling capacity performance of a device among electrode materials of the supercapacitor is an electrode active material. A porous carbon-based material having a high specific surface area has been used as an electrode material, and activated carbon having a high specific surface area of about 1,500 square meters per gram ($m^2/g$) to about 2,000 $m^2/g$ has been used. However, with respect to the carbon-based materials, since the distribution of pores may be non-uniform, low electrode density may be observed due to the high specific surface area, and a binder material, such as a polymer, may be mixed for the formation of an electrode, and thus, conductivity may be reduced.

Therefore, there remains a need to develop an electrode having improved density and having a distribution of pores and an electrode structure which facilitate the diffusion of electrolyte ions.

An electrode structure according to an embodiment of the present invention has a structure in which a graphene film having a nanomaterial dispersed on at least one surface thereof is wound to form a roll shape. A single, continuous graphene film may be repeatedly wound around a central axis, to form the roll shape, but is not limited thereto or thereby.

The graphene film includes only a single graphene sheet or a laminate of a plurality of single graphene sheets. As used herein, a graphene sheet may be a single atomic layer graphene sheet, a network sheet having graphene flakes connected to one another, or a combination thereof.

Herein, the expression "single atomic layer graphene sheet" denotes a polycyclic aromatic sheet in which a plurality of carbon atoms are arranged on a single plane by being connected by covalent bonds (typical $sp^2$ bond) to one another. The carbon atoms connected by covalent bonds may form a six-membered ring as a basic repeating unit. However, a five-membered ring and/or a seven-membered ring may be further included. Therefore, the polycyclic aromatic sheet appears as a single atomic layer having a large area formed of covalent bonded carbon atoms.

The expression "network sheet having graphene flakes connected to one another" denotes a graphene sheet having a network structure in which graphenes each having the form of a flake, e.g., a small-sized discrete sheet, are connected to one another to be aligned in a single plane. This is different from the single atomic layer graphene sheet where the graphene sheet itself is formed of a single atomic layer having a large area. Thus, the above two sheets (e.g., "single atomic layer graphene sheet" and "network sheet") may be classified according to the fact that, with respect to the network sheet, graphene flakes are connected to one another to form a single graphene sheet.

The graphene sheet may include a single atomic layer graphene sheet or a network sheet having graphene flakes connected to one another, and may include a combination thereof.

The graphene film may include only a single layer of the graphene sheet or may include a plurality of the single layers which are stacked. A thickness of the graphene film is not particularly limited and the thickness of the graphene film may be adjusted by units of micrometers (μm) according to a concentration of a precursor dispersion and an area of a drying rack in a manufacturing process. In one embodiment, for example, the thickness of the graphene film is about 1,000 μm or less, and may be in a range of about 10 nanometers (nm) or more to about 100 μm or less.

The graphene film may be porous. Electrolyte ions may pass through pores defined in the graphene film. Since the pores defined in the porous graphene film provide a path through which the electrolyte ions may pass between contact surfaces of graphene films in contact with each other, e.g., when the porous graphene film is wound in the form of a roll to form an electrode structure, the diffusion of the electrolyte ions between the contacting graphene films in the electrode structure may be further promoted.

A nanomaterial is dispersed in and/or on at least one surface of the graphene film. The nanomaterial may have a discrete, individual particle shape; a relatively thin elongated shape such as a tube, a wire, a rod and a fiber; or an arbitrary or non-uniform, non-discrete bulk unit shape, or may have a combined shape of two or more thereof.

Various compounds may be used as the nanomaterial. The nanomaterial is not particularly limited, but the nanomaterial may be electrochemically stable and may have electrical conductivity. In one embodiment, for example, the nanomaterial may include carbon nanotubes, carbon nanoparticles, carbon nanowires, carbon nanofibers, fullerene, graphite, activated carbon, carbon black, metal, a metal compound, an organic compound, a polymer, a carbide thereof, or a combination thereof. Herein, the metal may include lithium, sodium, potassium, rubidium, cesium, iridium, nickel, manganese, vanadium, titanium, chromium, silver, molybdenum, tungsten, and an alloy thereof or a combination thereof. The metal compound may include oxide, nitride, sulfide, carbide, or halide of the above metals, or a combination thereof. Examples of the organic compound may include pentacene, tetracene, anthracene, 9,10-dichloroanthracene, or 9,10-dibromoanthracene. Examples of the polymer may be phenol-formaldehyde, polyacrylonitrile, styrene divinylbenzene, cellulose-based polymer, poly(furfuryl alcohol), or cyclotrimerized diethynyl benzene. A material formed by carburization of the polymer through a heat treatment may also be used as the nanomaterial. One of the nanomaterials may be used alone or two or more nanomaterials may be used.

The nanomaterial may reduce or effectively prevent re-stacking of the graphene film by allowing facing surfaces of the rolled graphene film to be separated from each other by a predetermined spacing when the graphene film is wound in the form of a roll, and simultaneously, the nanomaterial may provide a space in which electrolyte ions may move between the layers formed by the wound graphene films.

An average diameter (or average size) of the nanomaterial may be in a range of about 1 nm to about 200 nm, so as to secure an appropriate space facilitating the diffusion of electrolyte ions between the facing surfaces of the rolled graphene film and achieve an electrode structure having a high specific surface area as well as a high electrode density. Specifically, the average diameter (or average size) of the nanomaterial may be in a range of about 1 nm to about 100 nm, or about 2 nm to about 100 nm, and for example, may be in a range of about 2 nm to about 10 nm.

In terms of uniformly securing a space between the facing surfaces of the rolled graphene film, the nanomaterial may be substantially uniformly dispersed on the surface of a graphene film without agglomeration, such as individual units of the nanomaterial are disposed across the surface and separated from each other. Methods of dispersing a nanomaterial on a surface of the graphene film include a liquid immersion method, a two-zone vapor transport method, an electrochemical method and a co-intercalation method, which will now be described in further detail below.

Liquid Immersion Method: In one embodiment, for example, a graphene film or a precursor thereof is immersed in a liquid medium in which a nanomaterial or a precursor thereof is dissolved or dispersed in a solvent, and the solvent is removed through a centrifuge method or a vacuum filtration method. Then, a graphene film having the nanomaterial dispersed on one or more surfaces thereof may be obtained through selective drying or a heat treatment and/or additional exfoliation.

Herein, the expression "precursor of a graphene film" denotes a material that may be converted into a graphene film through drying or a heat treatment and/or additional exfoliation. In one embodiment, for example, the precursor of a graphene film may include a graphene oxide film, an acid-graphite composite in which acid is intercalated between layers of a layered graphite material, expanded graphite, or worm-like graphite in which each layer of expanded graphite is not completely separated through an ultrasonic treatment. However, the precursor of a graphene film is not limited thereto.

Various solvents may be used as the solvent used in the liquid immersion method so long as the solvent may wet graphite or graphene. Examples of the solvent may include alcohols such as ethanol and methanol, acetone, dodecane, tetrahydrofuran ("THF"), or distilled water. A combination solvent of two or more thereof may be used, but the solvent is not limited thereto.

Two-Zone Vapor Transport Method: A graphene film and a nanomaterial are respectively disposed in a first chamber and a second chamber connected through a channel, and the first chamber and the second chamber are independently heated to predetermined temperatures to convert the nanomaterial into a gas phase. Then, the gas phase is dispersed on the graphene film by a diffusion process. In the above process, content and an arrangement method of the nanomaterial may be changed according to parameters such as a type of the nanomaterial, and temperature and vapor pressure in a chamber. With respect to the nanomaterial, an intercalation process is accelerated as a size of molecules is smaller, and thus, a well-aligned intercalation layer of an intercalation compound may be obtained. Also, an intercalated amount of the intercalation compound may be increased as the vapor pressure increases.

Electrochemical Method: A nanomaterial may be dispersed on a graphene film through electrolysis by using the graphene film as an electrode and the nanomaterial as a counter electrode, in an electrolyte.

Co-intercalation Method: The co-intercalation method denotes that two or more nanomaterials are simultaneously intercalated into a graphene film or a precursor thereof. The co-intercalation method is useful when various metals, metal compounds or composites are intercalated as precursors of nanomaterials. The co-intercalation method is differentiated only by the fact that chemically different two or more materials are targeted as the nanomaterials, and the foregoing vapor transport method or liquid immersion method may be used as a particular process.

Where two or more nanomaterials, the above dispersion methods, such as a vapor transport method or a liquid immersion method, may be sequentially used as in the co-intercalation method. When the nanomaterials are sequentially dispersed, a scope of the nanomaterials being dispersed may be expanded.

In addition to the above methods, various methods known in the art, such as chemical vapor deposition ("CVD"), physical vapor deposition ("PVD"), plasma-enhanced CVD ("PECVD"), sputtering, arc deposition, plasma arc deposition and spray hydrolysis, may be used.

The nanomaterial may be uniformly dispersed on the surface of the graphene film, in the electrode structure including the graphene film or a portion thereof.

A content of the nanomaterial in the electrode structure is not particularly limited and may be appropriately determined in consideration of type and shape of the nanomaterial, and a distribution area on the graphene film. In one embodiment, for example, a content of the nanomaterial used may be in a range of about 1 wt % to about 100 wt %, specifically, about 10 wt % to about 70 wt %, and for example, may be in a range of about 10 wt % to about 30 wt % based on a total weight of the nanomaterial and the graphene film.

The graphene film having the nanomaterial dispersed on the surface thereof is wound in the form of a roll to form an electrode structure. Herein, the graphene film having the nanomaterial dispersed on the surface thereof may be wound in the form of a roll where the graphene film has a single layer or two or more single layers stacked.

The form of a roll may include various forms, such as an elliptical form and a polygonal form, in addition to a circular form. However, the form of the roll is not particularly limited. The particular shape "form" of such roll may hereinafter refer to a planar shape of the cross-section of the roll.

An electrode structure may be obtained by separating a portion of an initial graphene film wound in the form of a roll, where the separated portion has a predetermined thickness taken in a direction substantially perpendicular to an extension direction of a central axis of the roll. The electrode structure may have top and bottom surfaces having a roll shape and an outer surface having a predetermined thickness (e.g., height) taken along the extension direction of the central axis. The top and bottom surfaces of the electrode structure are a cross-section of the wound graphene film. In one embodiment of providing the electrode structure, a predetermined thickness of the wound graphene film having a nanomaterial dispersed on the surface thereof is separated from a remainder of the wound graphene film to provide the electrode structure having the form of a roll. In the wound graphene film, a direction of the cross-section showing the form of a roll (e.g., the top and bottom surfaces of the electrode structure) and a direction of the central axis of the form of a roll may be substantially perpendicular to each other or may be inclined within an angle range of about 90 degrees ±45 degrees.

A thickness of the electrode structure, and a planar area or a diameter of the top and bottom surfaces (e.g., the cross-section of the wound graphene film) of the rolled electrode structure are not particularly limited. Dimensions of the electrode structure may be adjusted so as to be suitable for an electrode of an electric device applied, for example, of an electrochemical capacitor or a secondary battery. In one embodiment, for example, the thickness of the electrode structure may be in a range of about 10 µm to about 1,000 µm, specifically, about 10 µm to about 200 µm, and for example, may be in a range of about 10 µm to about 100 µm. The area or the diameter of the top and bottom surfaces (e.g., the cross-section of the wound graphene film) of the electrode structure is not particularly limited, and the number of windings may be increased when the formation of the electrode structure having a larger area is aimed. With respect to an electrode structure wound in the form of a circular roll, a diameter of the electrode structure, for example, may be within a range of about 1,000 µm to about 200,000 µm.

A space between facing graphene film surfaces in the electrode structure may be secured in a range of about 1 nm to about 200 nm due to the nanomaterial disposed between the facing graphene film surfaces. Also, since the graphene film is wound in the form of a roll to provide the electrode structure, the electrode structure may have a high electrode density. In one embodiment, for example, the electrode density may be in a range of about 0.1 gram per cubic centimeter (g/cc) to about 1.5 grams per cubic centimeter (g/cc), specifically about 0.5 g/cc to about 1.2 g/cc, and for example, may be in a range of about 0.7 g/cc to about 1.2 g/cc.

Figure 1:
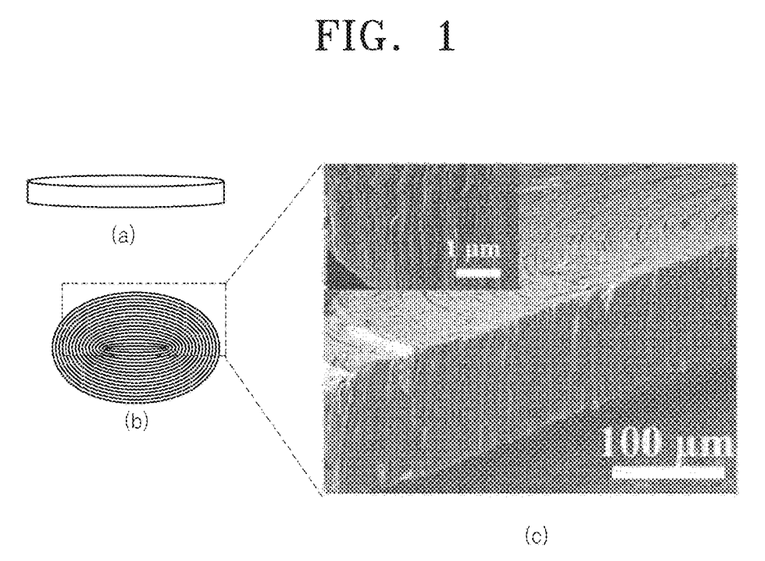
FIGS. 1(a) through 1(c) illustrate an electrode structure according to an embodiment of the present invention.

FIG. 1 illustrates an electrode structure according to an embodiment of the present invention. In FIG. 1, (a) illustrates a perspective side view of the electrode structure according to the present invention and (b) illustrates a top plan view of the electrode structure having the form of a roll. The form of the roll illustrated in FIG. (b) shows an elliptical form, but the present invention is not limited thereto. The top left view in FIG. 1 (c) is a scanning electron microscope ("SEM") image showing the top surface and the remaining view in FIG. 1 (c) is an SEM image showing a radial surface, each surface of the electrode structure exposed by cutting a portion of the wound graphene film manufactured according to an embodiment of the present invention.

As illustrated in FIG. 1, the electrode structure according to the illustrated embodiment has a structure in which a graphene film is wound in the form of a roll, and a predetermined space between facing graphene film surfaces may be secured, in which adjacent surfaces of the graphene film are not attached to each other owing to a nanomaterial dispersed on the surface of the graphene film. In this rolled graphene film structure, electrolyte ions may diffuse between the facing graphene film surfaces even though they are not attached to each other. Where an electrode is provided by disposing the top surface or the a bottom surface of the rolled electrode structure to be in contact with a current collector (not shown), the rolled form of the graphene film, such as the thickness direction thereof, may be aligned in a direction perpendicular to the contacted surface of the current collector referencing the SEM image of FIG. 1(c). The form of a roll may help to allow the vertically-aligned graphene film to stably maintain a position thereof.

An electrode according to another embodiment may further include a current collector; and the foregoing rolled electrode structure disposed on the current collector.

A metal foil or a metal foam including a metallic material, such as gold (Au), platinum (Pt), titanium (Ti), copper (Cu), nickel (Ni) or aluminum (Al), a graphite plate, a carbon foam, a polymer film coated with a metallic substance, or glass coated with a particular material, which does not participate in an electrode reaction, is electrochemically stable and has excellent electrical conductivity, may be used as the current collector. However, the current collector is not limited thereto. Where a metal foil, such as an aluminum foil, a copper foil, a titanium foil or a nickel foil, is used as the current collector, a thickness thereof may be set to be in a range of about 20 µm to about 30 µm. Also, a surface of the current collector may have a fine uneven shape so as to promote effective contact with the rolled electrode structure.

The rolled electrode structure is disposed so as to allow the top or bottom surface thereof (e.g., the cross-section of the wound graphene film roll) to be in contact with the current collector, and as a result, the rolled graphene film may be aligned perpendicular to the current collector. The rolled form of the electrode structure may allow the graphene film to be maintained in a stable arrangement when the graphene film is disposed perpendicular to the current collector.

Figure 2:
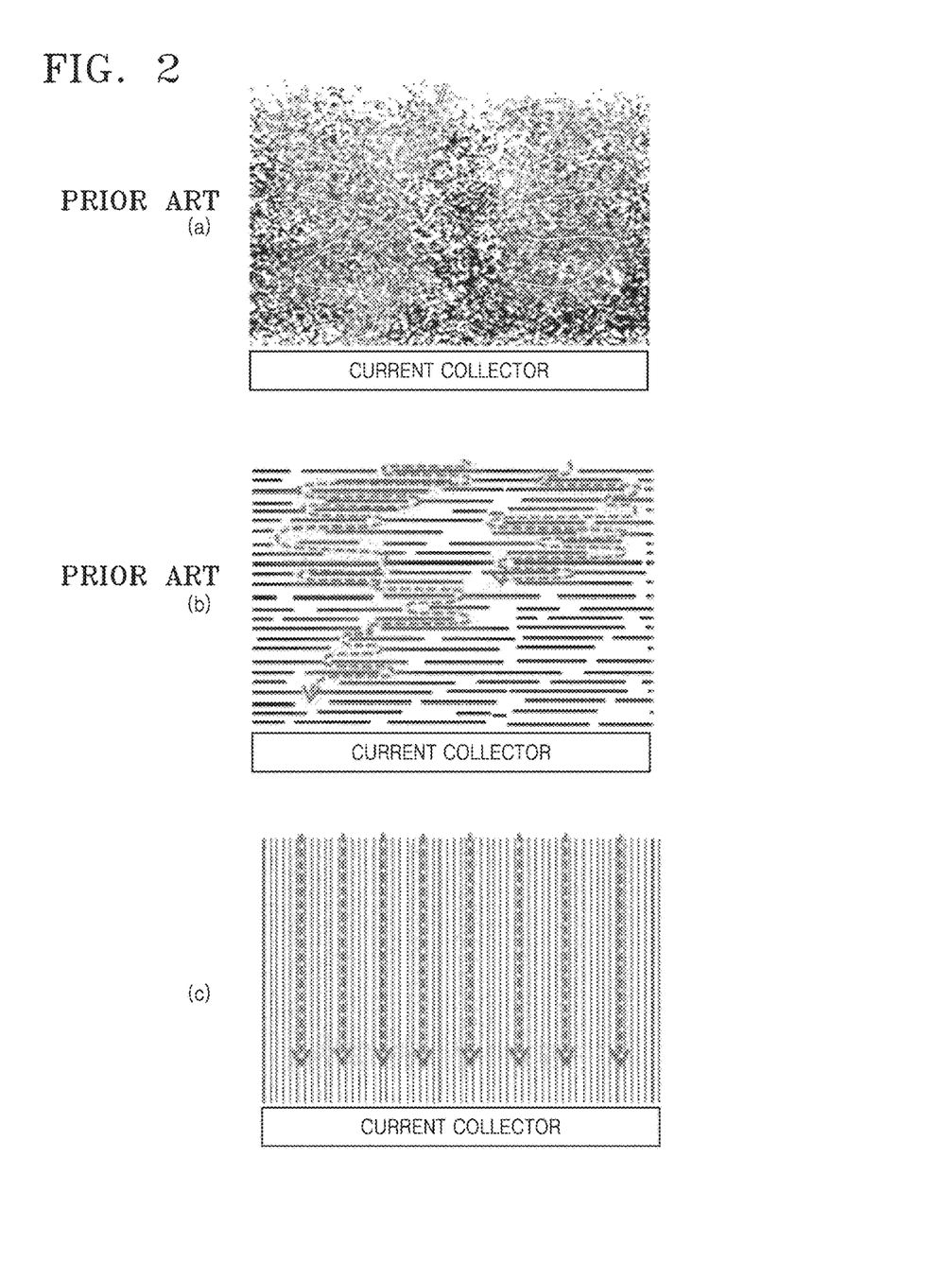
FIG. 2 schematically illustrates differences between diffusion of an electrolyte and migration paths of electrolyte ions in an electrode provided by using a typical electrode material and an electrode according to an embodiment, in which 2(a) is an electrode provided using carbon powder, such as activated carbon, 2(b) is an electrode which allows a graphene stack to be parallel with a current collector, and 2(c) is an electrode provided using an electrode structure, in which a graphene film is wound in the form of a roll, according to an embodiment of the present invention.

FIG. 2 schematically illustrates differences between the diffusion of an electrolyte and migration paths of electrolyte ions in an electrode provided by using a typical electrode material and an electrode according to an embodiment of the present invention. In FIG. 2, (a) illustrates an electrode is provided using carbon powder, such as activated carbon, as the typical electrode material, disposed on a current collector (COLLECTOR), (b) illustrates an electrode including a graphene stack as the typical electrode material, where the graphene stack is parallel with a current collector (COLLECTOR), and (c) illustrates an electrode provided using an electrode structure, in which a graphene film is wound in the form of a roll, according to an embodiment of the present invention, where the rolled graphene film and the current collector (COLLECTOR) are vertically aligned with respect to each other.

With respect to the electrode in which carbon powder is randomly disposed by being typically mixed with a binder as illustrated in FIG. 2(a), a length of a diffusion path of the electrolyte ions may be significantly increased. Similarly, with respect to the graphene electrode horizontally aligned (e.g., parallel) to the current collector as illustrated in FIG. 2(b), since an electrolyte penetrates into an electrode layer by using a horizontal space between graphene stacks during the formation of the electrode layer, a length of a diffusion path of the electrolyte ions may be increased. The diffusion paths are indicated by dark, dotted lines, and a direction of flow is indicated by the arrowhead of such lines.

In contrast, with respect to the electrode according to the embodiment of the present invention in which the rolled graphene film is aligned perpendicular to the current collector as illustrated in FIG. 2(c), since an open channel may be defined by facing graphene film surfaces aligned vertically so as to facilitate the diffusion of the electrolyte ions, a length of a diffusion path of the electrolyte ions may be significantly decreased.

Referring to FIG. 2(c), the flow channels of the rolled graphene film are elongated in the thickness direction of the electrode structure (or along the central axis of the rolled graphene film) and defined by the facing graphene film surfaces. The flow channels may be perpendicular to the current collector and/or a surface of the current collector upon which the electrode structure including the rolled graphene film is disposed. The flow channels are exposed to outside the electrode structure at the top or bottom surface thereof (e.g., at the cross-section of the wound graphene film or at the top or bottom surface of the electrode structure).

With respect to an energy storage device, charging and discharging may occur due to the diffusion of electrolyte ions into an active electrode, and power and energy density may be determined. With respect to typical electrodes such as shown in FIG. 2 (a) and FIG. 2 (b), since the diffusion length of the electrolyte ions is relatively long, complete charging and discharging of the energy storage device may not occur, and a phenomenon of decreasing power and energy density may occur. In contrast, with respect to the electrode, such as shown in FIG. 2(C), according to the present invention, since the diffusion path of the electrolyte ions may be reduced owing to the vertical alignment of the facing graphene film surfaces within the rolled form, charging and discharging of the energy storage device may more effectively occur in comparison to the typical electrodes, and as a result, power and energy density may increase.

Also, when the electrode structure having a wound graphene film is used as an active electrode layer, a binder may not be used in the electrode. With respect to a typical electrode material such as carbon powder, a binder, such as a polymer, is used in order to increase density and adhesion during the formation of the electrode. The use of the binder may decrease electrical conductivity of the electrode material and thus, may act as a cause of performance degradation of an electric device employing the electrode structure. In contrast, since an electrode according to an embodiment of the present invention may directly include the electrode structure wound in the form of a roll even through the binder is not used, a decrease in the electrical conductivity due to the use of the binder may be reduced or effectively prevented and as a result, performance of the electric device including the electrode structure may be improved. Alternatively, in an embodiment of the present invention, a binder may be additionally used in the electrode if necessary, during the formation of the active electrode layer including the electrode structure.

An electric device according to another embodiment of the present invention includes the electrode including the rolled electrode structure. Non-restrictive examples of the electric device may be various display devices such as a field emission display ("FED"), a liquid crystal display ("LCD") and an organic light-emitting diode ("OLED"); various energy storage devices such as a secondary battery, an electrochemical capacitor, a fuel cell and a solar cell; various nanodevices such as a field effect transistor ("FET") and a memory device; and various electric devices such as other hydrogen storage bodies, an optical fiber and a sensor.

Figure 3:
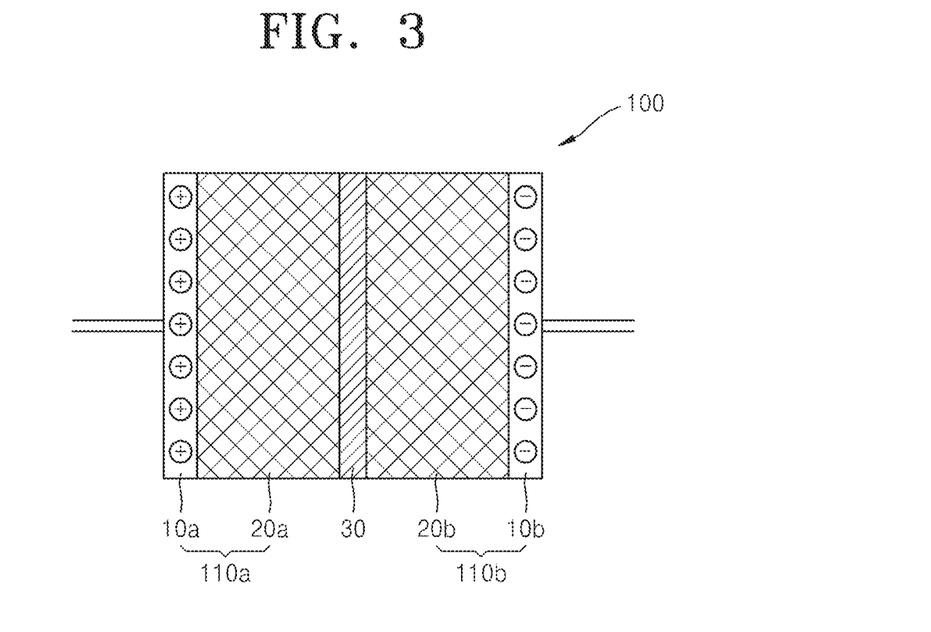
FIG. 3 is a schematic view illustrating an electrode of a supercapacitor according to an embodiment of the present invention.

A supercapacitor may be an example of an electrochemical capacitor including the rolled electrode structure. FIG. 3 schematically illustrates a supercapacitor according to an embodiment of the present invention.

Referring to FIG. 3, a supercapacitor 100 may include a first electrode 110a including of a first current collector 10a and a first active layer 20a; a separator 30; a second electrode 110b including a second current collector 10b and a second active layer 20b; and an electrolyte (not shown) filled in the first and second active layers 20a and 20b. The first electrode 110a and the second electrode 110b are symmetrical about the separator 30, and structures and characteristics thereof may be the same. Therefore, the first electrode 110a will be described in detail and the description of the second electrode 110b may be substituted by the description of the first electrode 110a.

The first electrode (hereinafter, referred to as "electrode for a supercapacitor" or "electrode") 110a may include the first current collector (hereinafter, referred to as "current collector") 10a and the first active layer (hereinafter, referred to as "active layer") 20a. The current collector 10a may collect electrons from the active layer 20a or may provide electrons to the active layer 20a. As described above, a metal foil or a metal foam including a metallic material, such as Au, Pt, Ti, Cu, Ni or Al, a graphite plate, a carbon foam, a polymer film coated with a metallic substance, or glass coated with a particular material, which does not participate in an electrode reaction, is electrochemically stable and has excellent electrical conductivity, may be used as the current collector 10a. However, the current collector 10a is not limited thereto.

The active layer 20a may be disposed on the current collector 10a. The active layer 20a includes the electrode structure in which a graphene film having a nanomaterial dispersed on a surface thereof is wound in the form of a roll. Facing surfaces of the wound graphene film may be aligned perpendicular to the current collector 10a so as to allow an exposed cross-section of the wound graphene film (e.g., the top or bottom surface of the electrode structure) to be in contact with the current collector 10a. The vertical alignment of the electrode structure including the graphene film may be the same as described above.

The supercapacitor 100 may include the separator 30 between the first electrode 110a and the second electrode 110b. The separator 30 blocks the migration of electrons between the first electrode 110a and the second electrode 110b, and thus, may reduce or effectively prevent an electrical short between the two electrodes 110a and 110b. Herein, the separator 30 may include propylene, polyethylene, or tetrafluoroethylene (e.g., Teflon®). However, the separator 30 is not limited thereto.

The supercapacitor according to an embodiment of the present invention may include an electrode structure which may control dimension and/or distribution of pores defined therein so as to increase the diffusion of electrolyte ions, may have high density, and simultaneously, may stably maintain the rolled graphene film structure disposed perpendicular to the current collector. Thus, power and energy density may be improved.

Hereinafter, a method of manufacturing an electrode structure according to an embodiment of the present invention will be described.

The method of manufacturing an electrode structure may include:
  providing a graphene oxide film having a nanomaterial dispersed on a surface thereof;
  winding the graphene oxide film about a center axis;
  separating a portion of the wound graphene oxide film from a remainder of the wound graphene oxide film; and
  reducing the separated graphene oxide film.

Figure 4:
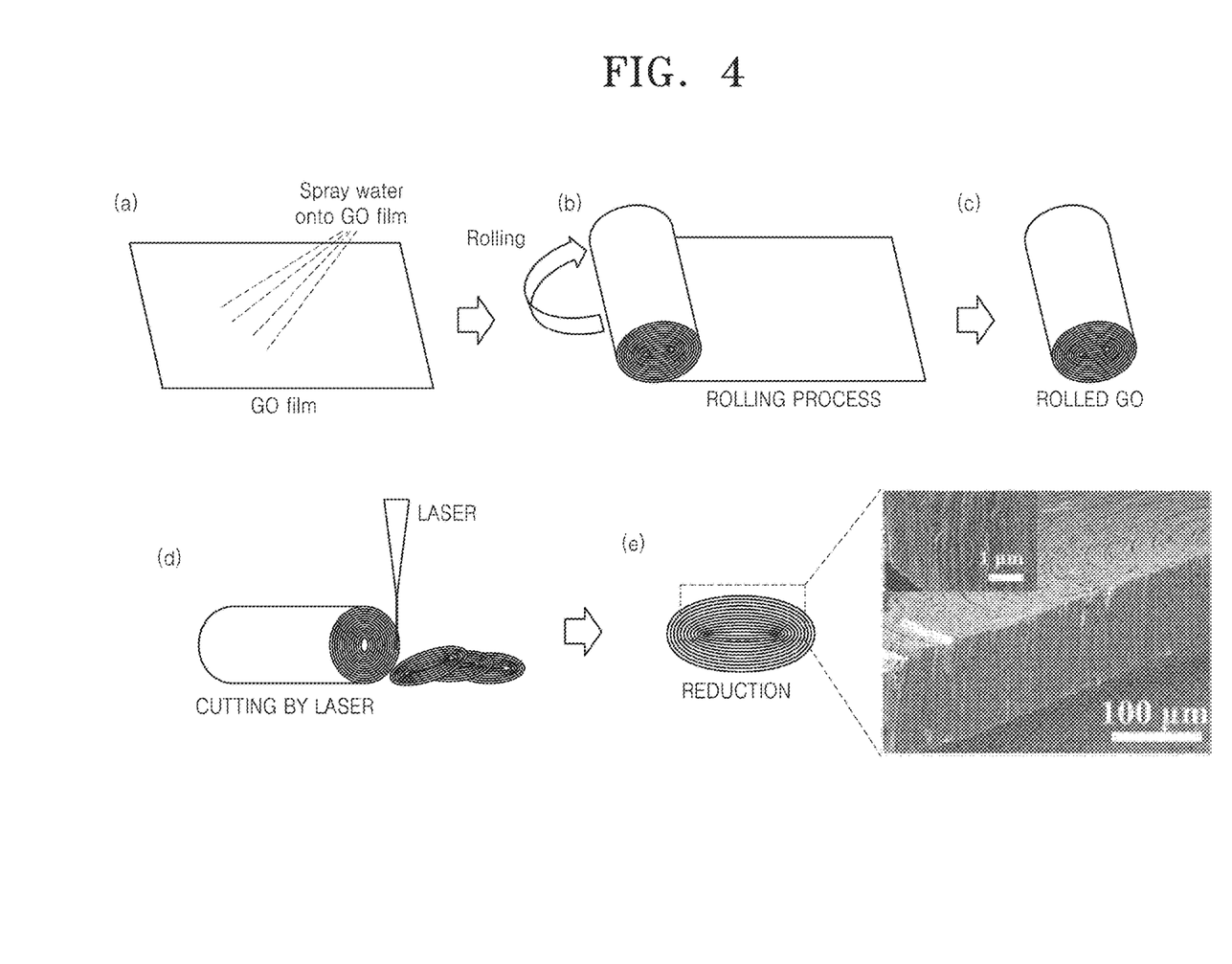
FIGS. 4(a) through 4(e) are schematic views illustrating a method of manufacturing an electrode structure according to an embodiment of the present invention.

FIG. 4 schematically illustrates a method of manufacturing an electrode structure according to an embodiment of the present invention.

A commercially available graphene oxide film may be used as the graphene oxide film or a graphene oxide film may be directly provided and used as the graphene oxide film. Where a graphene oxide film is directly provided, the graphene oxide film, for example, may be provided as follows.

First, a layered graphite material is immersed in an acid solution to intercalate an acid between the layers of graphite and thus, an acid-graphite composite is prepared. The acid-graphite composite is expanded by a heat treatment to synthesize graphite oxide or expanded graphite. The graphite oxide or the expanded graphite thus synthesized is not a single sheet of a graphene oxide film, but is in a state of graphite in which only an interlayer distance is increased. A graphene oxide film may be obtained therefrom through an additional exfoliation process. Where a physical force is applied, graphite oxide or expanded graphite is immersed in a solvent and ultrasonically treated to be exfoliated into a graphene oxide film, and the graphene oxide film may be collected by a centrifuge or vacuum filtration method. Also, a film may be obtained by coating with a solution having a graphene oxide film dispersed therein. Spraying, bar coating, or screen printing may be used as a coating method. The solution having the graphene oxide film dispersed therein may be introduced as in a subsequent dispersion process of a nanomaterial.

As described above, a method of dispersing a nanomaterial on a surface of the graphene oxide film may include methods such as a liquid immersion method, a two-zone vapor transport method, an electrochemical method and a co-intercalation method, and the liquid immersion method among the above methods may be used.

A graphene oxide film having a nanomaterial dispersed on the thereof is prepared and the graphene oxide film is then wound. A method of winding may include winding manually or winding by using an automated method such as including non-manual equipment, for example, an electric motor, that may rotate the graphene oxide film about a central axis while fixing a portion thereof.

In order to wind the graphene oxide film about the central axis at a high density, the surface of the graphene oxide film may be coated with an organic solvent including, but not limited to, water capable of dispersing graphene oxide such as by using a sprayer, and winding may be performed after the surface of the graphene oxide film is wet in order to increase the adhesion between facing graphene oxide film surfaces. FIG. 4(a) illustrates contacting water with the previously prepared graphene oxide (GO) film. Winding may be performed by selectively coating the surface of the graphene oxide film with a graphene oxide paste or a high-concentration graphene oxide dispersion. Also, winding may be performed using a highly viscous polymer, an organic and an acryl-based adhesive. Winding may be effectively performed with the graphene oxide film having a wet surface. FIG. 4(b) illustrates the graphene oxide (GO) film being wound about a central axis in a rolling process.

When the graphene oxide film is wound, a size of an electrode structure may be adjusted by controlling the number of windings applied during the rolling process, in order for the electrode structure finally obtained to be suitable for an electrode configuration of an electric device in which the electrode structure is used. The number of windings may be increased in order to form an electrode structure having a wide cross-section. FIG. 4(c) illustrates a finally wound graphene oxide (GO) film, having an exposed cross-section at opposing ends thereof, and an overall height of the finally wound graphene oxide (GO) film is taken along the same direction as the central axis. The cross-sections each have a maximum dimension (e.g., a diameter) and a planar area. The maximum dimension of a cross-section may also be referred to as a width of the roll.

As illustrated in FIG. 4(d), a portion of the wound graphene oxide (GO) film may be separated from a remainder of the wound graphene oxide (GO) film, and the separated portion has a predetermined thickness as a portion of the overall height of the graphene oxide (GO) film. The separating denotes that the portion having a relative small height (e.g., becoming a "thin layer" of the wound graphene oxide (GO) film) is separated along a cross-sectional direction perpendicular or tilted to the central axis of the wound graphene oxide (GO) film. In the wound graphene oxide (GO) film, a plane of the exposed cross-section and the direction of the central axis may be perpendicular to each other or may be tilted within an angle range of about 90 degrees±45 degrees.

A method of separating a portion of the wound graphene oxide film from a remainder thereof is not particularly limited, and for example, may employ cutting using a razor blade, a blade, a microtome, polishing or a laser beam.

A spacing along central axis of the wound graphene oxide film for separating portions of the wound graphene oxide film is not particularly limited. In one embodiment, for example, an electrode structure having a desired thickness may be obtained by separating portions of the wound graphene oxide (GO) film at a spacing ranging from about 10 μm to about 1,000 μm.

Subsequently, the separated portion of the wound graphene oxide film is reduced. The views in FIG. 4(e) are the same as those of FIG. 1(b) and FIG. 1(c), and repetitive explanation thereof is omitted.

A chemical, thermal, or thermal-chemical reduction process may be used as a reduction process.

The chemical reduction process may include various methods, such as a fuming method, a dipping method and an in-situ method, according to a reducing agent. Examples of the reducing agent may be hydrazine ($N_2H_4$), iodic acid (HI), ascorbic acid or $NaBH_4$. With respect to hydrazine, a method of reducing a graphene oxide film by using a hydrazine vapor or a method of in-situ reduction, in which a graphene oxide solution is prepared as a reduced graphene oxide ("rGO") solution, may be used.

In one embodiment, for example, in the thermal reduction process, the graphene oxide film may be reduced by performing a heat treatment at about 100 degrees Celsius (° C.) or more. In another embodiment, for example, the thermal reduction process may be selectively performed at a temperature ranging from about 100° C. to about 1,900° C. The heat treatment, for example, may be performed at about 400° C. or more. The heat treatment may be performed by adjusting a heating rate during the thermal reduction process. The reason for this is that a shape of the electrode structure may be collapsed when the heating rate is relatively high. In one embodiment, for example, the heat treatment during the thermal reduction process may be performed by heating to about 150° C. at a rate ranging from about 0.15° C. per minute (° C./min) to about 0.5° C./min and thereafter, may be performed by heating at a rate ranging from about 0.5° C./min to about 10° C./min.

The thermal-chemical reduction is a process of combining the foregoing chemical reduction and thermal reduction.

An electrode structure obtained by reducing the separated graphene oxide film has a black color and is conductive.

Hereinafter, the present invention will be exemplified, according to the following examples. However, the protective scope of the present invention is not limited thereto.

Manufacturing Example 1

Graphene oxide was synthesized from graphite by using a modified-Hummer's method. First, about 460 milliliters (mL) of $H_2SO_4$ as an oxidant was mixed with about 12 grams (g) of graphite (Samchun Chemical Co., Bay carbon) and the mixture was strongly stirred for about 6 hours. A solution thus obtained was diluted three times by adding deionized, distilled water and a reaction was then terminated by slowly dropping about 50 mL of hydrogen peroxide (30% $H_2O_2$) thereon. The synthesized graphene oxide was separated by using a centrifuge. The graphene oxide thus obtained was dispersed at a concentration of about 1 g/L in an ethanol solvent to prepare a dispersion, and the dispersion was poured into a drying frame and dried to prepare a graphene oxide film. Next, a surface of the graphene oxide film was coated with deionized water by using a sprayer. When the surface of the graphene oxide film was wet after about 5 minutes and a small amount of adhesion was obtained, the graphene oxide film was wound to have an overall diameter of about 1.2 cm before the graphene oxide film was completely dried. Subsequently, a portion of the wound graphene oxide film having a thickness of about 200 μm or less, was separated from a remainder of the wound graphene oxide film by using a laser beam.

The graphene oxide structure thus separated was reduced by heating to about 150° C. at a rate of about 0.15° C./min and being maintained for about 90 minutes. Then, an electrode structure including the separated portion of the wound graphene oxide film and having a graphene film wound in the form of a roll was manufactured by heating to about 1,000° C. at a rate of about 10° C./min.

Example 1

Graphene oxide was added to deionized water to obtain a solution having a concentration of the graphene oxide of about 1 mg/mL. Single wall carbon nanotubes ("SWCNT") (Hanwha Chemical Co., Ltd., Korea) was added to the solution at about 5 wt % based on a total weight of the graphene oxide solution and the SWCNT to prepare a mixed solution. The mixed solution was sonicated for about 3 hours by using an ultrasonic cleaner (power sonic 470) and dispersed at 6,500 rpm for about 1 hour by using a homogenizer (WiseTis® by DAIHAN Scientific). The concentration of the graphene oxide solution was increased to a range of about 5 mg/mL to about 10 mg/mL by degassing through a solvent evaporator (BUCHI Corporation, USA). About 300 mL to about 500 mL of the graphene oxide solution, after the degassing, was poured into a drying frame (30 cm×30 cm).

The drying frame containing the graphene oxide solution was put in a clean bench and dried for about 24 hours.

The graphene oxide film after completion of the drying was cut to an initial size of about 2 cm×30 cm. In order to improve adhesion of the graphene oxide film, a surface of the cut graphene oxide film was coated with water by spraying before the graphene oxide film was wound. When the surface of the graphene oxide film had viscosity after 5 minutes, the graphene oxide film was wound by hand so as to have a diameter of about 1.2 cm.

The wound graphene oxide film was dried at room temperature for about 12 hours and then dried at about 80° for about 12 hours. After the drying was completed, the graphene oxide film wound in the form of a bar was coated with a paraffin film (Sigma-Aldrich®, USA). A portion of the wound graphene oxide film was then cut to a thickness of about 100 µm at −20° C. by using a microtome (Leica Biosystems, Germany).

A surface of the graphene oxide structure thus cut was etched using an oxygen ($O_2$) plasma system (Femto Science Co., Ltd., Korea) at an oxygen flow rate of about 50 standard cubic centimeters (sccm) and a discharge power of about 10 watts (W). Thereafter, the etched graphene oxide structure was put in a chamber of a vacuum heat treatment apparatus (high temperature furnace, Atech System Ltd., Korea) and heat treated in vacuum for about 90 minutes after being heated to about 150° C. at a rate of 0.15° C./min. Then, the temperature was increased to about 1,000° C. at a rate of about 10° C./min and a heat treatment was then performed for about 3 hours to obtain a graphene electrode structure after completion of the reduction Cell Fabrication and Performance Tests Proto-type cells and coin-cells were fabricated by using the graphene structure obtained in Example 1, and performance tests were conducted.

Example 2: Proto-Type Cell Fabrication

Fabrication of proto-type cells were conducted for water-based experiments. Two sheets of antistatic slide glass, current collectors (a Ti foil (120 µm, 1 cm×4 cm) to be used with respect to a 1M $H_2SO_4$ aqueous solution, and a Ni foil (120 µm, 1 cm×4 cm, Sigma-Aldrich®) to be used with respect to a 6M KOH aqueous solution), separators (Whatman filter paper), electrolytes (1M $H_2SO_4$ aqueous solution, 6M KOH aqueous solution), and a polyimide tape were prepared.

First, each current collector was disposed at the center of the slide glass and the graphene electrode structure was disposed within a range of about 1 cm to about 1.5 cm from edges of the current collector having a planar size of about 1 cm×4 cm. Then, the current collector excluding the graphene electrode structure and the slide glass were fixed with the polyimide tape. The separator was disposed between two electrodes and the two electrodes were fixed with a tetrafluoroethylene (e.g., Teflon®) tape to prepare each assembled cell. Each assembled cell was immersed in an electrolyte solution for about 3 hours to fabricate each proto-type cell Example 3: Coin-Cell Fabrication A separator (Celgard, LLC., 3501) and 1M 1-butyl-3-methylimidazolium tetrafluoroborate (BMIM-BF4, Sigma-Aldrich®) dissolved in acrylonitrile as an electrolyte were used for the fabrication of a coin-cell. With respect to the coin-cell, since the graphene structure had a structure in the form of a film, the separate use of a current collector is not required.

First, the graphene structure obtained in Example 1 was disposed on the center of an aluminum bottom case and about 200 µL of the electrolyte was dropped on the graphene electrode structure. Thereafter, the separator was disposed thereon and about 200 µL of the electrolyte was dropped on the separator. The graphene structure obtained in Example 1 as a counter electrode was disposed on the center of a case and the case was sealed with a spring to complete the fabrication of a coin-cell.

Performance Tests

All performance tests were conducted in a dried room. An electrical potential window for each cell was changed from about 1.0 volts (V) to about 3.5 V according to electrolytes. Performance tests for the proto-type cells were conducted at scan rates of about 10 millivolts per second (mV/s), about 30 mV/s, about 50 mV/s and about 100 mV/s, and performance tests for the coin-cells were conducted at scan rates of about 10 mV/s, about 50 mV/s, about 100 mV/s, and about 200 mV/s.

Performance of each cell was as follows.

Figure 5:
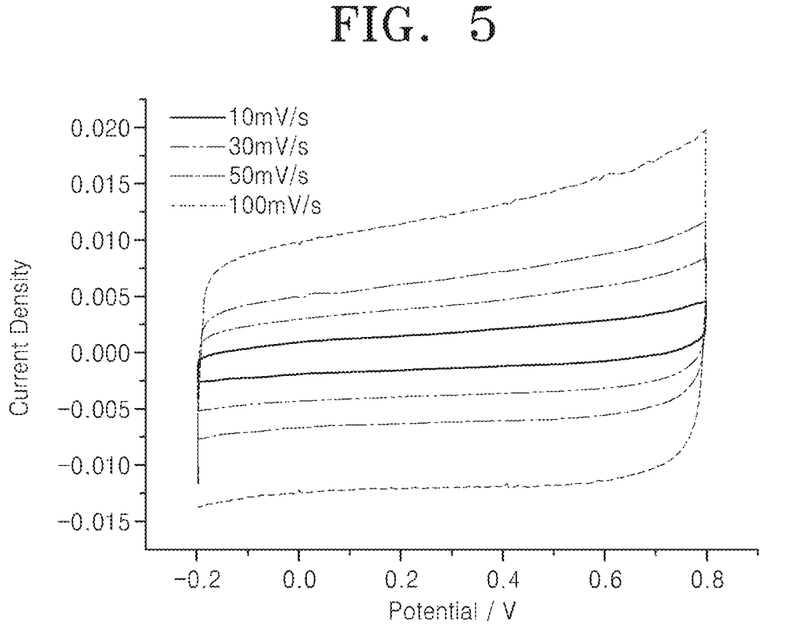
FIG. 5 is a graph illustrating current density measurements of a proto-type cell of Example 2 using a 6M potassium hydroxide (KOH) electrolyte.
Figure 6:
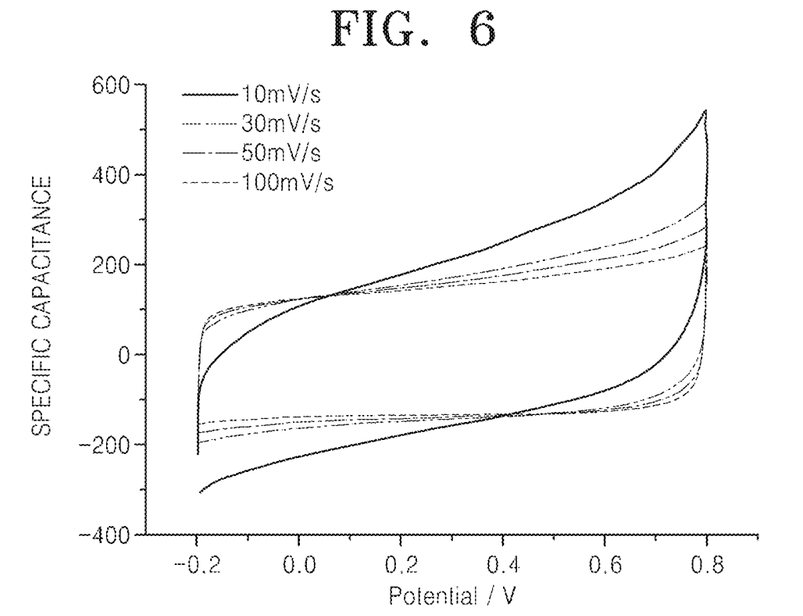
FIG. 6 is a graph illustrating specific capacitance measurements of the proto-type cell of Example 2 using the 6M KOH electrolyte.

The results of current density measurements and specific capacitance measurements of the proto-type cell of Example 2 using a 6M KOH electrolyte, conducted at scan rates of about 10 mV/s, about 30 mV/s, about 50 mV/s and about 100 mV/s, are presented in FIGS. 5 and 6, respectively.

Referring to FIG. 5, it may be understood that, with respect to the 6M KOH electrolyte, capacitance-voltage ("CV") curves were maintained without any changes at a scan rate ranging from about 10 mV/s to about 100 mV/s. Also, since rectangular-shaped CV curves were maintained, it may be understood that performance of an optimized supercapacitor was obtained. A more optimized supercapacitor may be obtained as the rectangular shaped curves were further maintained. FIG. 6 illustrates the results of capacitance calculated based on the results of FIG. 5. As illustrated in FIG. 6, it may be understood that capacitance was maintained at a constant level at a scan rate ranging from about 30 mV/s to about 100 mV/s, instead of at a low scan rate of about 10 mV/s. This may be actually regarded as a high-rate capacitor.

Figure 7:
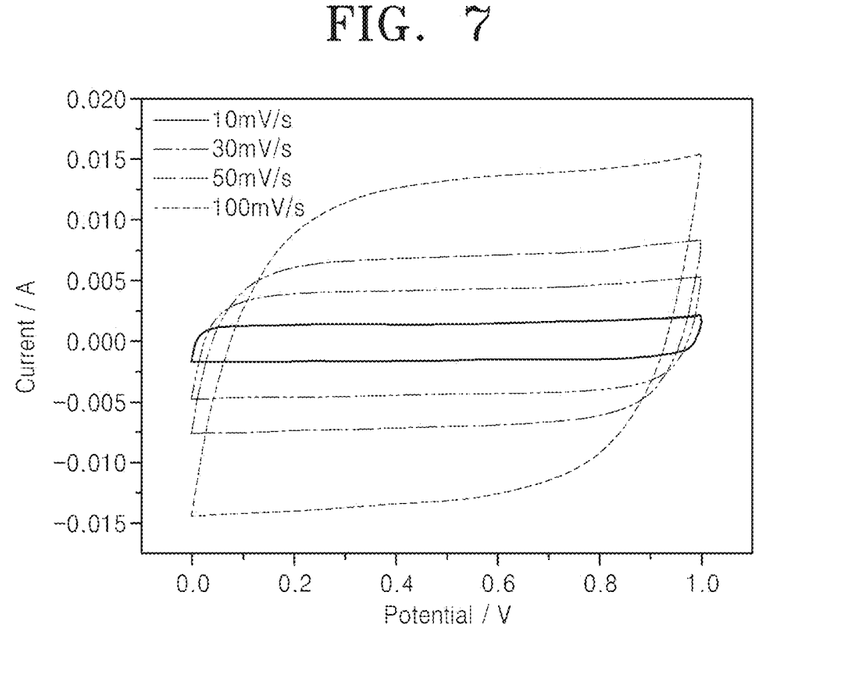
FIG. 7 is a graph illustrating current density measurements of a proto-type cell of Example 2 using a 1M sulfuric acid ($H_2SO_4$) electrolyte.
Figure 8:
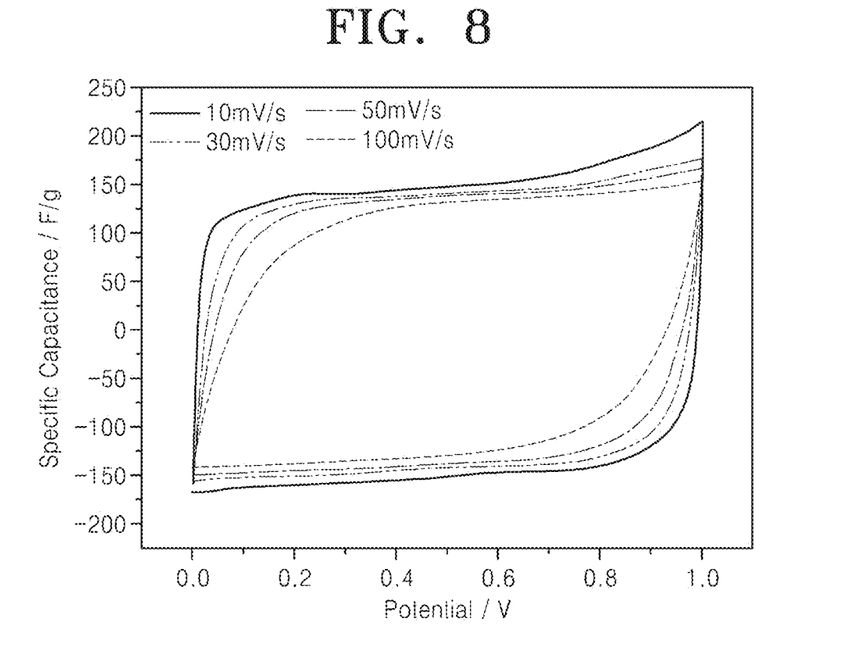
FIG. 8 is a graph illustrating specific capacitance measurements of the proto-type cell of Example 2 using the 1M $H_2SO_4$ electrolyte.

The results of current density measurements and specific capacitance measurements of the proto-type cell of Example 2 using a 1M $H_2SO_4$ electrolyte, conducted at the scan rates of about 10 mV/s, about 30 mV/s, about 50 mV/s and about 100 mV/s, are presented in FIGS. 7 and 8, respectively.

As illustrated in FIGS. 7 and 8, with respect to the supercapacitor using the 1M $H_2SO_4$ electrolyte, although a rectangular shape of CV curves was not maintained in comparison to the supercapacitor using the 6M KOH electrolyte (i.e., denoting that some resistance was present), high current density was exhibited, and thus, better capacitance may be obtained.

Referring to FIGS. 5 to 8, it may be understood that different characteristics may be obtained by using two types of electrolytes. This result indicated that an electrolyte may be designed to match the characteristics of a device.

With respect to an organic-based electrolyte using an ionic liquid, a coin-cell was fabricated using a 1M BMIM BF4/ACN electrolyte and performance tests for a graphene electrode having a vertical structure were conducted under measurement conditions of a potential window ranging from about 0.0 V to about 3.5 V and scan rates of about 10 mV/s, about 50 mV/s, about 100 mV/s, and about 200 mV/s. With respect to the coin-cell of Example 3 using a 1M BMIM BF4 electrolyte, the results of specific capacitance, galvano charge/discharge, and impedance measurements are presented in FIGS. 9, 10 and 11, respectively.

With respect to an organic-based electrolyte, since ionic conductivity of the organic-based electrolyte is lower than that of a water-based electrolyte, it may not be favorable to capacitance. However, a scope of voltage may be increased about three times in comparison to the water-based electrolyte. This means that energy density may be increased.

Figure 9:
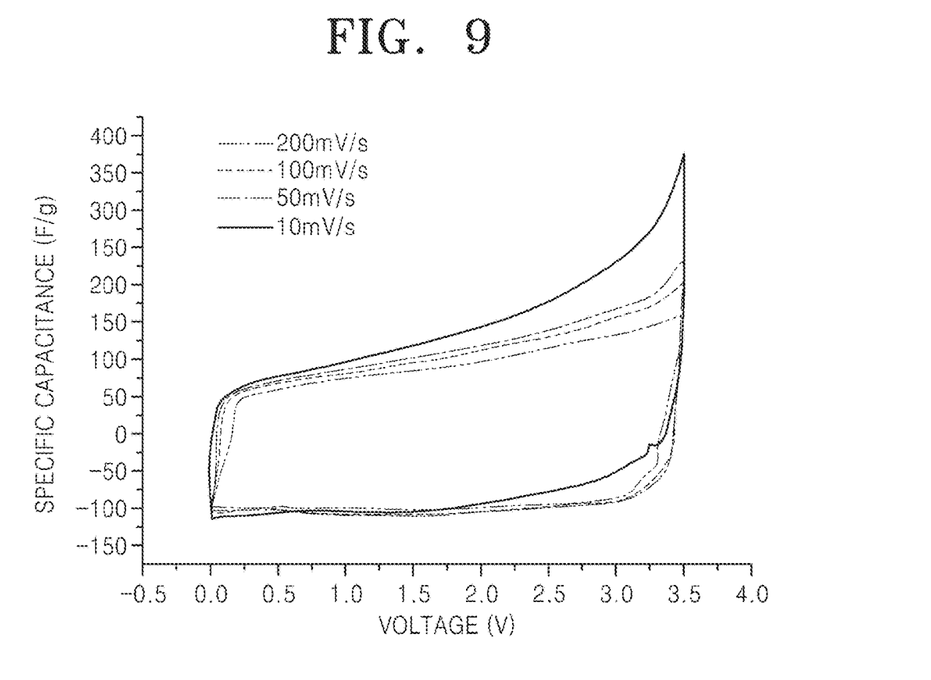
FIG. 9 is a graph illustrating specific capacitance measurements of a coin cell of Example 3 using a 1M 1-butyl-3-methylimidazolium tetrafluoroborate (BMIM BF4) electrolyte according to a scan rate.

FIG. 9 illustrates capacitance according to the scan rates of about 10 mV/s, about 50 mV/s, about 100 mV/s, and about 200 mV/s. Capacitance was decreased as the scan rate increased, and this may be interpreted as a characteristic of the organic-based electrolyte.

Figure 10:
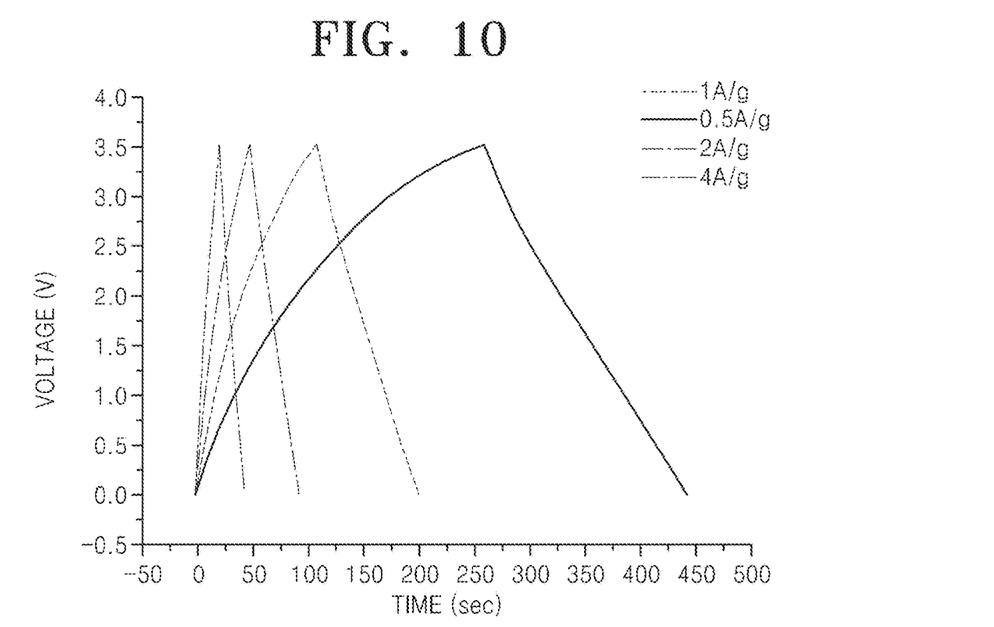
FIG. 10 is a graph illustrating galvano charging/discharging of the coin cell of Example 3 using the 1M BMIM BF4 electrolyte.

FIG. 10 illustrates the results of galvano charging/discharging. Since charge and discharge curves are uniformly obtained, it may be considered that the coin cell was stable.

Figure 11:
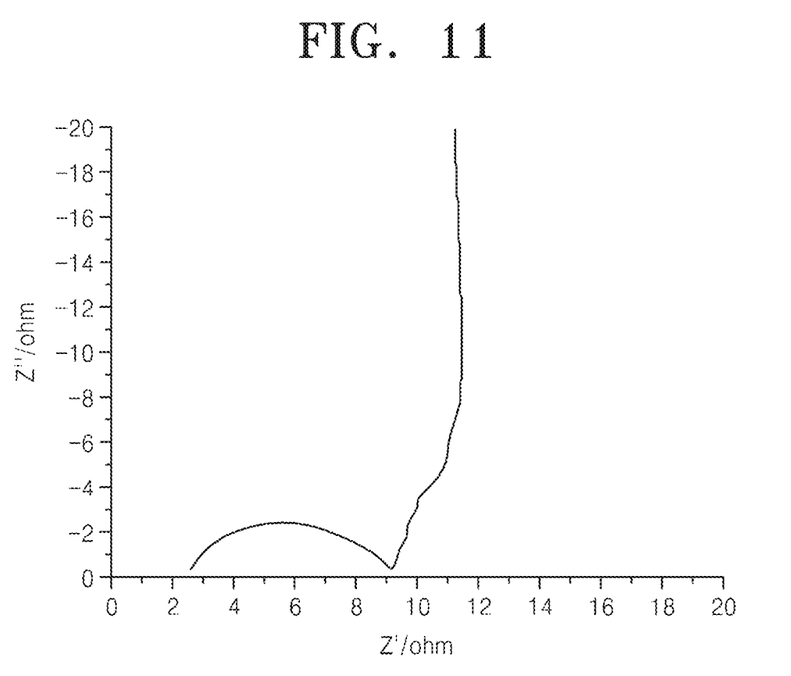
FIG. 11 is a graph illustrating impedance measurements of the coin cell of Example 3 using the 1M BMIM BF4 electrolyte.

Also, as illustrated in FIG. 11, a resistance of the electrode using the organic-based electrolyte was about 9 ohm. However, since the slope of a curve is vertical, it may be understood that an optimized capacitor was obtained.

As described above, according to the one or more of the above embodiments of the present invention, since a graphene film is wound in the form of a roll, the electrode structure formed from the wound graphene film may exhibit a high electrode density. Where the electrode structure is used in an electric device, for example, an energy storage device such as a supercapacitor, the electrode structure being vertically aligned to a current collector may be stably maintained, and thus, migration of electrolyte ions may be facilitated. Therefore, an energy storage device including the electrode structure may exhibit high power and energy density.

While the present invention has been particularly shown and described with reference to embodiments thereof, it will be understood by those of ordinary skill in the art that various changes in form and details may be made therein without departing from the spirit and scope of the present invention as defined by the following claims.

What is claimed is:

1. An electrode structure comprising:
    a rolled graphene film which is wound about a central axis, and
    a nanomaterial dispersed on a surface of the rolled graphene film, the nanomaterial providing a space between facing surfaces of the rolled graphene film,
    wherein the nanomaterial comprises carbon nanotubes, fullerene, carbon nanowires, carbon nanofibers, or a combination thereof.

2. The electrode structure of claim 1, wherein the graphene film comprises:
    a single graphene sheet or a laminate of a plurality of graphene sheets.

3. The electrode structure of claim 2, wherein the graphene sheet is a single atomic layer graphene sheet, a network sheet having graphene flakes connected to one another, or a combination thereof.

4. The electrode structure of claim 1, wherein an average thickness of the graphene film is about 1,000 micrometers or less.

5. The electrode structure of claim 1, wherein the graphene film is porous.

6. The electrode structure of claim 1, wherein the nanomaterial has a shape of a discrete particle, a tube, a wire, a rod, a fiber or a non-uniform, non-discrete bulk unit, or a combined shape thereof.

7. The electrode structure of claim 1, wherein an average diameter of the nanomaterial is in a range of about 1 nanometer to about 200 nanometers.

8. The electrode structure of claim 1, wherein the nanomaterial is dispersed on the surface of the graphene film without agglomeration.

9. The electrode structure of claim 1, wherein a content of the nanomaterial is in a range of about 1 wt % to about 50 wt % based on a total weight of the nanomaterial and the graphene film.

10. The electrode structure of claim 1, wherein a top or bottom surface of the electrode structure has a shape of in a circular form, an elliptical form or a polygonal form.

11. The electrode structure of claim 1, wherein a thickness of the electrode structure is in a range of about 10 micrometers to about 1,000 micrometers, taken along the central axis.

12. The electrode structure of claim 1, wherein a density of the electrode structure is in a range of about 0.1 gram per cubic centimeter to about 1.5 grams per cubic centimeter.

13. An electric device comprising:
    an electrode, the electrode comprising:
        a current collector; and
        the electrode structure of claim 1, on the current collector.

14. The electric device of claim 13, wherein
    a top or bottom surface of the electrode structure is inclined with respect to the central axis, and contacts the current collector, and
    flow paths are defined between facing graphene film surfaces of the rolled graphene film, elongated along the central axis and substantially perpendicular to the current collector.

15. The electric device of claim 13, wherein the electric device is a supercapacitor, a secondary battery, a fuel cell or a solar cell.

* * * * *